No. 699,454. Patented May 6, 1902.
F. D. COOK.
CULTIVATOR ATTACHMENT.
(Application filed Jan. 28, 1902.)
(No Model.)
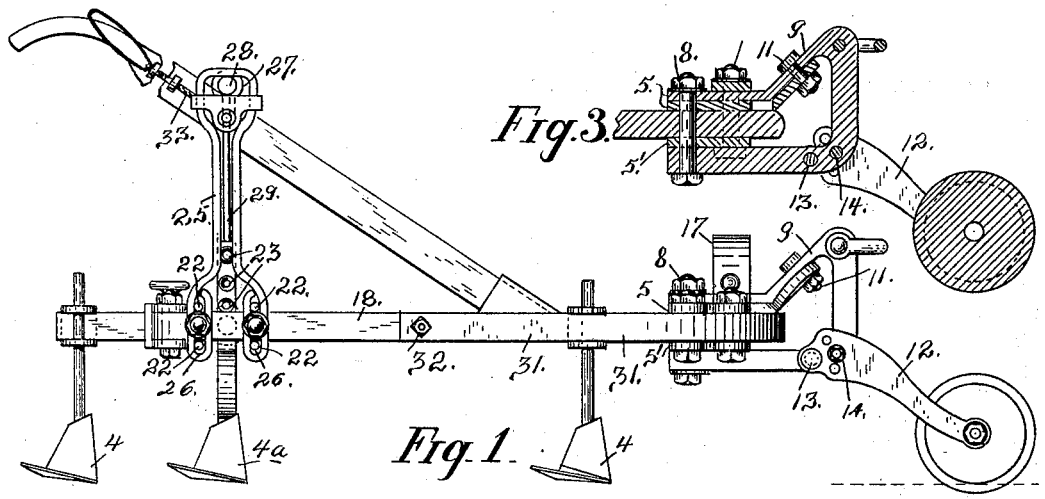
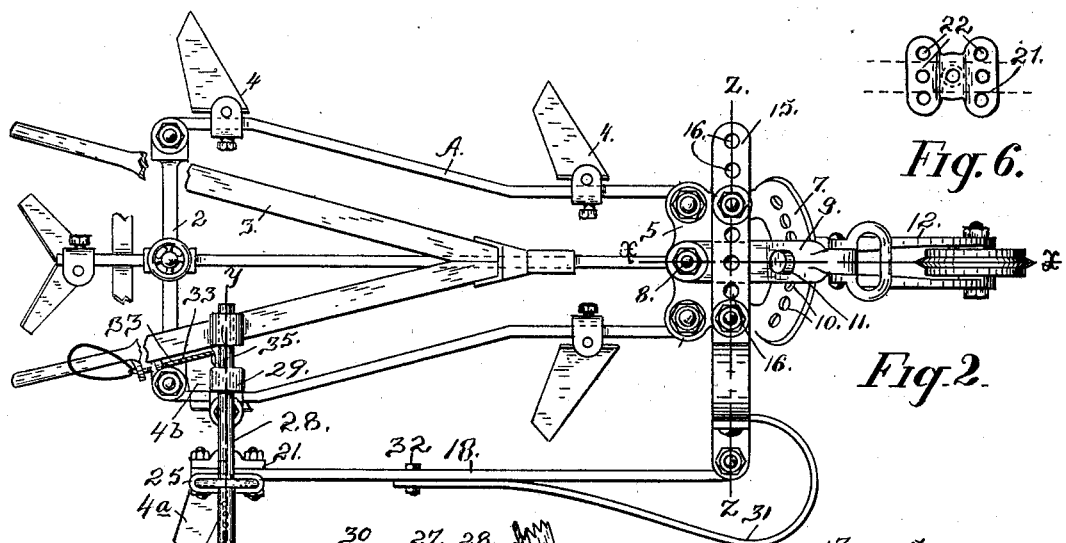
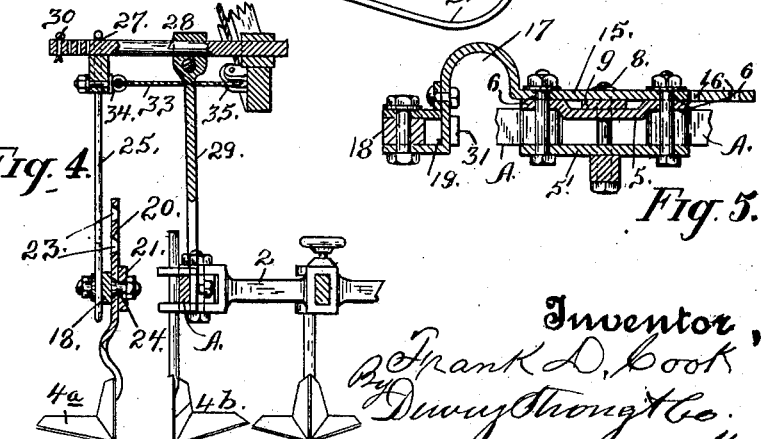
Witnesses,
Inventor,
Frank D. Cook

UNITED STATES PATENT OFFICE.

FRANK D. COOK, OF TERMINUS, CALIFORNIA.

CULTIVATOR ATTACHMENT.

SPECIFICATION forming part of Letters Patent No. 699,454, dated May 6, 1902.

Application filed January 28, 1902. Serial No. 91,554. (No model.)

*To all whom it may concern:*

Be it known that I, FRANK D. COOK, a citizen of the United States, residing at Terminus, county of San Joaquin, State of California, have invented an Improvement in Cultivator Attachments; and I hereby declare the following to be a full, clear, and exact description of the same.

My invention relates to improvements in farming implements of the type known as "cultivators" and "weeders." It is particularly intended for use in connection with the tilling of corn, beets, and the like where it is desirable to cultivate close up to the row on either side.

It consists in the combination, with a main cultivator-frame, of a supplementary lateral adjustable frame by which the cultivator is adapted to straddle the row and of an improved form of clevis attachment and draft-equalizing means.

It comprises details which will be more fully set forth hereinafter, having reference to the accompanying drawings, in which—

Figure 1 is a side elevation. Fig. 2 is a top plan view. Fig. 3 is a sectional view taken on the line $x\ x$ of Fig. 2. Fig. 4 is a sectional view taken on the line $y\ y$ of Fig. 2. Fig. 5 is a sectional view taken on the line $z\ z$ of Fig. 2. Fig. 6 is a detached view of adjustable "clip" 21.

A represents a main cultivator-frame consisting of bars pivotally secured at their forward end and extending backward divergently, being held in proper relation to each other by means of the adjustable braces 2. Suitable handles 3 are provided by which the machine may be guided. Cultivating or weeding shovels or plows 4 are secured to this frame, as shown. The forward end of the frame-bars are held between the two plates 5 5', the upper of which is provided with the perforated lug 6 and also with the curved flange 7. This flange is concentric with the pivot 8 of the clevis 9 and has a series of perforations 10. By means of a bolt 11 the clevis may be set at any angle in relation to the axis of the cultivator, so that the line of draft may be equalized for the purpose to be hereinafter seen. A colter-frame 12 is pivoted to the clevis at 13, and by means of a bolt 14, passing through perforations in the frame and clevis, the colter may be adjusted as desired. The object in carrying the colter on the clevis as shown is that it may always operate in the line of draft irrespective of whatever angle the clevis may be disposed in relation to the axis of the cultivator. A bar 15 is secured to the lugs 6 of the upper clevis-plate. This bar is perforated at 16, so as to be adjustable. The projecting portion of this bar is curved upwardly, as shown at 17. A bar or arm 18, extending lengthwise of the machine, is pivoted in a bracket 19 on the end of the curved bar. At the rear end of the arm 18 is carried a shovel $4^a$ by means of a standard 20, adjustably secured in a clip 21. This clip has a series of transverse perforations 22, whereby the clip may be bolted to the arm 18 at any desired angle. The standard 20 is perforated, as at 23, so that the depth at which the shovel is to operate may be regulated. The standard is slidable in a groove in the clip, and the two are secured together by means of a short bolt 24, as shown in Fig. 4. A bracket 25, having two separated members whose ends are bent to form vertical guide-slots 26 and whose upper portion has a transverse slot or loop 27, is secured to the bar 18 by the same bolts which hold the clip 21 thereto. Extending out from the main cultivator-frame is a perforated guide-rod 28, which is suitably supported by the standard 29. This rod extends through the loop 27 of the bracket 25, and the outward swing of the lateral arm 18 is limited by means of a key 30, fitting the perforations of the rod. In order to maintain the rear end of the arm in proper position, so that the shovel $4^a$ will be suitably separated from its adjacent complementary shovel $4^b$ on the main frame and accommodate the row in the intervening space, I provide a stiff curved spring 31, which has one end secured to the arm at 32 and the other to the bracket 19. The tendency of this spring is to turn the arm 18 outwardly.

This device is admirably adapted to the cultivation of corn, beets, and other vegetables where it is desired to cut out weeds and work the ground close up on either side of the row. The curved portion 17 of the transverse bar 16 allows the machine to ride over the tops of the corn without injury to the latter.

Where cultivating in orchards or vineyards and it is desired to cultivate around the trees, the flexible arm 18 permits the machine to be driven straight ahead instead of having to turn out for every tree. In such cases I provide suitable means by which the rear end of the arm may be drawn in toward the main frame whenever any obstruction is approached and be again released when the obstruction is passed. The means are here shown as a cord 33, having one end secured to the bracket 25 at 34 and running through suitable guides 35 to the hand of the operator. The end of the arm carrying the shovel $4^a$ is drawn in toward the main frame by a simple pull on the cord. This allows the operator to work the ground close up to and completely around the trees and obviates the necessity of guiding his team in and about each tree, as is ordinarily the case. The disposition of this supplemental frame upon one side of the cultivator has a tendency to throw the line of draft to one side of the axis of the cultivator. Hence the purpose of the curved perforated plate 5 and clevis attachment.

Having thus described my invention, what I claim, and desire to secure by Letters Patent, is—

1. A cultivator consisting in combination of a main plow-frame, a supplemental lateral frame pivoted thereto, plows or shovels adjustable on the lateral frame, a segmentally-flanged plate upon the main frame, a clevis pivoted thereon, said flange concentric with the pivot of said clevis, means for uniting said clevis and flange so that the former may stand at any desired angle in relation to the axis of the cultivator, and a colter carried by said clevis.

2. In a cultivator, the combination of main and supplemental plow-frames of a clevis attachment upon the main frame consisting of upper and lower plates united to said frame, a clevis pivoted thereon, said upper plate having a segmental flange concentric with the pivot of said clevis, perforations in said clevis and flange, and means for securing said parts rigidly together.

3. The combination in a cultivator with the main frame thereof, of a pivoted, supplemental, lateral frame, shovels or plows carried by said frames, and means including a spring member by which said lateral frame may be maintained at a distance from the main frame.

4. The combination in a cultivator of a main plow-frame, a transverse support carried thereby, and a supplementary spring-pressed plow-frame pivoted to said support, said frames adapted to straddle a row.

5. The combination in a cultivator of a main frame, a transverse bar secured thereon, a spring-pressed arm pivoted to the end of said bar and plows or shovels carried by said frame and bar.

6. The combination in a cultivator of a main plow-frame, a transverse bar adjustably secured to the forward end of said frame, an arm pivoted to the end of said bar, a standard having an adjustable tilting and vertical movement secured to said bar and plows or shovels secured to said standard.

7. The combination in a cultivator of a main plow-frame, a supplemental lateral frame secured thereto but adapted to have an intervening space therebetween, plows or shovels carried adjustably on said lateral frame, and spring means by which the two frames are normally separated.

8. The combination in a cultivator of a main plow-frame a transverse bar adjustably secured to said frame, a segmental projecting extension of said bar, an arm pivoted at the end of said extension, a spring adapted to press said arm outwardly from the frame, a plow or shovel adjustably carried on the rear end of said arm, a guide-rod extending outwardly from the frame and adapted to support the shovel end of said arm, means by which the outward or divergent movement of said arm may be limited and means connecting with the handles of the frame by which the arm may be drawn in toward the frame.

9. A cultivator consisting in combination of a main plow-frame, guiding-handles thereon, a curved bar extending outwardly from the forward portion of said frame, an arm pivoted to said bar, a spring by which said bar is normally held away from said frame, plows or shovels adjustably carried on the end of said arm, means connecting with the handles by which the bar may be drawn in toward said frame, a curved flanged plate secured to the frame, a clevis pivoted on said plate and adapted to be held at any desired angle in relation to the axis of the cultivator and a colter carried on said clevis.

In witness whereof I have hereunto set my hand.

FRANK D. COOK.

Witnesses:
S. H. NOURSE,
H. F. ASCHECK.